(12) United States Patent
Sugimoto et al.

(10) Patent No.: US 7,138,775 B2
(45) Date of Patent: Nov. 21, 2006

(54) CONTROL FOR BATTERY PACK

(75) Inventors: Tomonaga Sugimoto, Kanagawa (JP); Yuji Nakada, Kanagawa (JP); Utaka Kamishima, Kanagawa (JP); Tsuyoshi Morita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 579 days.

(21) Appl. No.: 10/603,810

(22) Filed: Jun. 26, 2003

(65) Prior Publication Data
US 2004/0018419 A1 Jan. 29, 2004

(30) Foreign Application Priority Data
Jul. 24, 2002 (JP) .............. 2002-214934

(51) Int. Cl.
*H02J 7/00* (2006.01)
*H02P 7/00* (2006.01)

(52) U.S. Cl. .............. 318/140; 318/141; 318/139; 307/10.6; 320/116; 429/320

(58) Field of Classification Search ........ 318/138–145; 320/116, 104, 135
See application file for complete search history.

(56) References Cited

U.S. PATENT DOCUMENTS

| | | | |
|---|---|---|---|
| 5,932,932 A * | 8/1999 | Agatsuma et al. | 307/10.6 |
| 5,965,996 A * | 10/1999 | Arledge et al. | 320/116 |
| 6,255,826 B1 * | 7/2001 | Ohsawa et al. | 324/426 |
| 6,262,561 B1 * | 7/2001 | Takahashi et al. | 320/104 |
| 6,573,688 B1 * | 6/2003 | Nakanishi | 320/135 |
| 6,646,442 B1 * | 11/2003 | Katoh | 324/433 |
| 2003/0001544 A1 * | 1/2003 | Nakanishi | 320/162 |
| 2003/0044689 A1 * | 3/2003 | Miyazaki et al. | 429/320 |
| 2004/0135544 A1 * | 7/2004 | King et al. | 320/116 |
| 2005/0242775 A1 * | 11/2005 | Miyazaki et al. | 320/116 |
| 2006/0022639 A1 * | 2/2006 | Moore | 320/116 |

FOREIGN PATENT DOCUMENTS

EP 1289096 A2 * 3/2003
JP 11-150873 A 6/1999

* cited by examiner

*Primary Examiner*—Paul Ip
(74) *Attorney, Agent, or Firm*—Foley & Lardner LLP

(57) ABSTRACT

A battery pack of a series combination of cell units is connected with a motor drive control circuit to drive a traction motor for a vehicle. A current sensor senses a discharge/charge current of the battery pack, and a voltage detecting circuit senses a voltage between two separate points in the series combination of the battery pack. A memory section stores a reference voltage drop quantity representing a decrease in voltage during a predetermined time interval between the two separate points. An offset detecting section compares an actual voltage drop quantity sensed by the voltage detecting circuit, with the reference voltage drop quantity, thereby detects a non-discharge/charge-current state of the current sensor, and reserves an output of the current sensor, as an offset quantity upon the detection. A correcting section corrects a sensed value of the discharge/charge current with the reserved offset quantity.

11 Claims, 6 Drawing Sheets

| CELL NUMBER | CELL VOLTAGE Vc | | |
|---|---|---|---|
| | 2V | 3V | 4V |
| 1a | ×11 | ×12 | ×13 |
| 1b | ×21 | ×22 | ×23 |
| 1c | ×31 | ×32 | ×33 |
| 1d | ×41 | ×42 | ×43 |

CONTROL FOR BATTERY PACK

BACKGROUND OF THE INVENTION

The present invention relates to control apparatus and method for a battery pack for a vehicle, and more specifically to control technology to improve a current sensing accuracy.

A Published Japanese Patent Application Publication No. H11(1999)-150873 shows an electric vehicle control system arranged to sense a charge/discharge current of a battery to detect the residual capacity of the battery accurately. This control system reserves an output value of a current sensor, as an offset value, when the battery is in a state free from charging and discharging, and corrects the sensed current value of the current sensor with the offset value in the normal operating state.

SUMMARY OF THE INVENTION

However, the control system of the above-mentioned electric vehicle control system is arranged to assume that the battery is in the non-charging/discharging state when the electric vehicle is in a rest state in which the key switch of the vehicle and a charging switch for commanding a battery charging operation are both in the off state. Therefore, the opportunity to update the offset quantity is limited. In the above-mentioned system, the offset correction is not accurately performed during the normal vehicle operation, and the current sensing accuracy is more or less low.

It is an object of the present invention to provide battery control apparatus and process devised to improve the current sensing accuracy.

According to one aspect of the present invention, a battery control apparatus comprises: a battery pack including a series combination of cell units; a motor drive control circuit to receive a discharge current from the battery pack to drive a traction motor of a vehicle, and to supply a charge current to the battery pack; a current sensor to sense a discharge/charge current flowing from the battery pack as the discharge current and flowing to the battery pack as the charge current; a voltage detecting circuit to sense a voltage between two separate points in the series combination of the cell unit of the battery pack; a reference voltage drop memory section to store a reference voltage drop quantity representing a decrease in voltage during a predetermined time interval between the two junction points in a reference state; an offset detecting section to compare an actual voltage drop quantity which is a decrease in voltage during the predetermined time interval between the two junction points, sensed by the voltage detecting circuit, with the reference voltage drop quantity stored in the reference voltage drop memory section, to detect a non-discharge/charge-current state of the current sensor in accordance with a result of comparison between the actual voltage drop quantity and the reference voltage drop quantity, and to reserve an output of the current sensor, as an offset quantity when the non-discharge/charge current state is detected; and a correcting section to correct a sensed value of the discharge/charge current sensed by the current sensor, in accordance with the offset quantity reserved by the offset detecting section.

According to another aspect of the invention, a battery control apparatus comprises: means for storing a reference voltage drop quantity representing a decrease in voltage during a predetermined time interval between two separate points in a series combination of cell units of a battery pack; means for comparing an actual voltage drop quantity which is a decrease in voltage during the predetermined time interval between the two separate points, sensed by a voltage detecting circuit, with the reference voltage drop quantity, and for detecting a non-discharge/charge current state in accordance with a result of comparison between the actual voltage drop quantity and the reference voltage drop quantity; means for storing, as an offset quantity, an output of a discharge/charge current sensor obtained when the non-discharge/charge-current state is detected; and means for correcting a sensed value of the discharge/charge current sensed by the current sensor, in accordance with the offset quantity.

According to still another aspect of the invention, a battery control process comprises: a first process element of sensing a voltage between two separate points in a series combination of cell units of a battery pack to determine an actual voltage drop quantity during a predetermined time interval; a second process element of comparing the actual voltage drop quantity with a preliminarily stored reference voltage drop quantity, to judge a non-discharge/charge-current state to be present in accordance with a result of comparison between the actual voltage drop quantity and the reference voltage drop quantity; a third process element of reserving, as an offset quantity, a sensed value of a discharge/charge current when the non-discharge/charge-current state is present; and a fourth process element of determining a corrected current value by subtracting the offset quantity from a sensed value of the discharge/charge current.

DETAILED DESCRIPTION OF THE INVENTION

Figure 1:
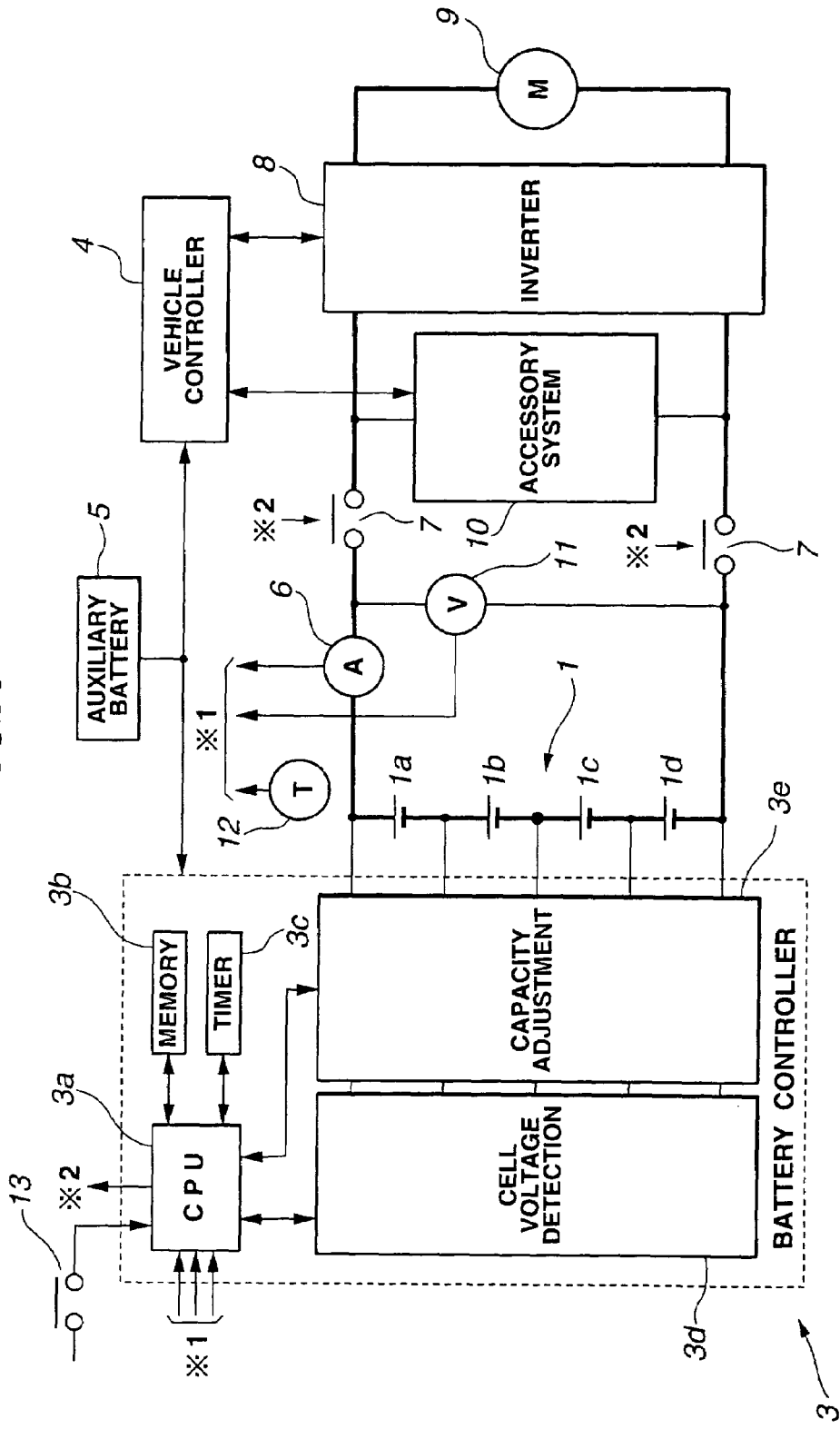
FIG. 1 is a schematic view showing a battery control system according to one embodiment of the present invention.

FIG. 1 shows a control system or apparatus for a battery pack for an electric vehicle (EV) according to one embodiment of the present invention. The battery pack is not limited to a battery of an electric vehicle. The battery pack which can be employed in the present invention may be a battery for a hybrid vehicle (HEV) or a battery pack of any of various other applications.

A battery pack 1 shown in FIG. 1 is a series combination of four cells 1a~1d. Battery pack 1 is a main battery as distinguished from an auxiliary battery 5 serving as a power source for a battery controller 3 and a vehicle controller 4. The cells are four in number in the example of FIG. 1, for convenience of illustration and explanation. The number of cells connected in series in main battery 1 is not limited to four. For example, main battery 1 may include 96 cells connected in series as a main battery for an electric vehicle.

Main battery 1 may be a series-parallel circuit including a plurality of parallel cell circuits connected in series. Each of the parallel cell circuits, or cell units or cell blocks is composed of a plurality of cells connected in parallel. In this case, no limitations are imposed on the number of cells in each parallel cell circuit, and the number of the parallel cell circuits. In such a battery pack of series-parallel connection, a battery control system is arranged to monitor an open-circuit cell voltage and a charge level SOC (state of charge) of each parallel block and to adjust the capacity of each parallel block.

Main battery 1 is connected through a current sensor 6 and a main relay 7, to an inverter 8 and an accessory system 10, to supply direct-current power to inverter 8 and accessory system 10. Inverter 8 changes direct-current power to alternating-current power and applies the alternating-current power to an alternating-current traction motor 9 to drive the vehicle. Moreover, inverter 8 functions to charge main battery 1 by converting alternating-current power regenerated by motor 9 during a braking operation of the vehicle, into direct-current power.

Battery controller 3 of this example is composed of a CPU 3a, a memory section or memory 3b, a timer 3b, a cell voltage detecting or sensing circuit 3d, and a capacity adjusting circuit 3e, and arranged to control the charging and discharging, and the capacity adjustment of main battery 1. Cell voltage detecting circuit 3d senses the terminal voltage or cell voltage of each of the cells 1a~1d of main battery 1. Capacity adjusting circuit 3e corrects the capacity nonuniformity from cell to cell, as mentioned later, in accordance with the sensed cell voltages.

Vehicle controller 4 controls the travel of the vehicle and the operations of accessories by controlling inverter 8 and accessory system 10. Accessory system 10 includes an air conditioner, lumps, wipers and other electric systems in the vehicle. Current sensor 6 senses a discharge current flowing from main battery 1 to inverter 8 and accessory system 10, and a regenerative charge current flowing from inverter 8 to main battery 1, and supplies information on the sensed currents to CPU 3a. Main relay 7 is opened and closed by CPU 3a, to make and break connection between main battery 1 and its load (motor 9 and accessory system 10).

A voltage sensor 11 senses the terminal voltage of main battery 1 between both terminals of main battery 1, and supplies information on the sensed voltage to CPU 3a. A temperature sensor 12 senses the temperature of main battery 1, and supplies information on the sensed temperature to CPU 3a. A main switch 13 corresponds to an ignition switch of an ordinary vehicle powered by an internal combustion engine. Main switch 13 turns on when a main key of the vehicle is set in a drive position.

Figure 2:
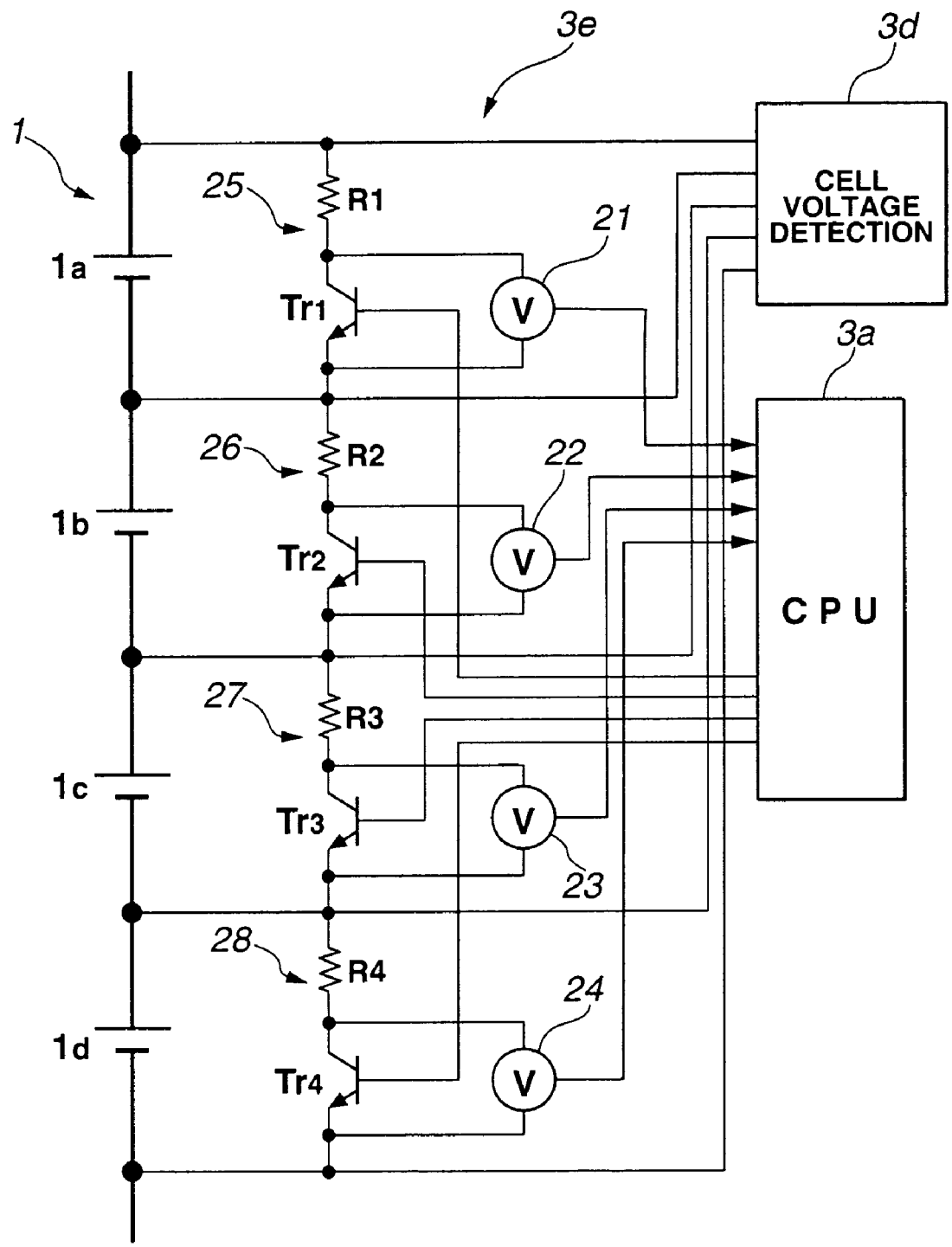
FIG. 2 is a diagram showing more in detail a capacity adjustment circuit shown in FIG. 1.

FIG. 2 shows capacity adjusting circuit 3e more in detail. Each of the cells 1a~1d is connected in parallel with a unique one of four series combinations 25~28. Each of the series combinations 25~28 includes a resistor R1, R2, R3 or R4 and a transistor Tr1, Tr2, Tr3 or Tr4 which are connected in series with each other. Each of the series combinations 25~28 is a circuit for discharging the stored amount of electricity in the corresponding one of the cells 1a~1d. The resistor R1, R2, R3 or R4 serves as a discharge resistor, and the transistor Tr1, Tr2, Tr3 or Tr4 serves as a switching element for enabling and stopping the discharge. In this example, the switch in each of the discharge circuits 25~28 is in the form of a bipolar transistor Tr1, Tr2, Tr3 or Tr4. However, the switch may be a semiconductor switching element such as FET, or a relay.

CPU 3a controls each of transistors Tr1~Tr4 individually between an on (conducting) state and an off (non-conducting) state by sending a signal to the base of the transistor. When the transistor Tr1, Tr2, Tr3 or Tr4 turns on, each of the cells 1a~1d discharges the stored electricity through the resistor R1, R2, R3 or R4, and the quantity of charged electricity or the SOC decreases accordingly. CPU 3a holds each transistor in the on state during a discharge period of the corresponding cell.

A voltage sensor 21, 22, 23 or 24 is connected between the collector and emitter of each transistor Tr1, Tr2, Tr3 or Tr4. The collector-emitter voltage between the collector and emitter of each transistor Tr1, Tr2, Tr3 or Tr4 becomes approximately equal to zero when the transistor turns on, and becomes equal to the terminal voltage of the corresponding cell 1a, 1b, 1c or 1d when the transistor turns off. CPU 3a monitors the collector-emitter voltage of each transistor Tr1, Tr2, Tr3 or Tr4 with the voltage sensor 21, 22, 23 or 24, and checks the operating condition of each transistor and the capacity adjustment state of each cell.

Capacity adjusting circuit 3e adjusts the capacity of each of the cells 1a~1d in main battery 1, and protects each cell from over-charge or over-discharge, to make the full use of the capacity of main battery 1.

In an electric vehicle control system of earlier technology, a controller regards, as non-charge/discharge state, a vehicle rest state of an electric vehicle in which a main switch of the vehicle and a charging switch are both in the off state; and uses as an offset value, the output of current sensor at the time of the non-charge/discharge state. Therefore, the opportunities for detecting the offset are limited, and hence the controller cannot correct the offset adequately during a normal vehicle operation, so that the current sensing accuracy is low. By contrast to this, the system according to the embodiment is arranged to sense the offset even in the normal vehicle operation, and thereby improve the sensing accuracy by correcting the sensed current with a most recent offset quantity.

Each cell 1a, 1b, 1c or 1d is connected with cell voltage detecting circuit 3d of battery controller 3. Cell voltage detecting circuit 3d discharges electricity from each cell and allow consumption of power. The power consumption differs cell to cell.

Figures 3, 4:
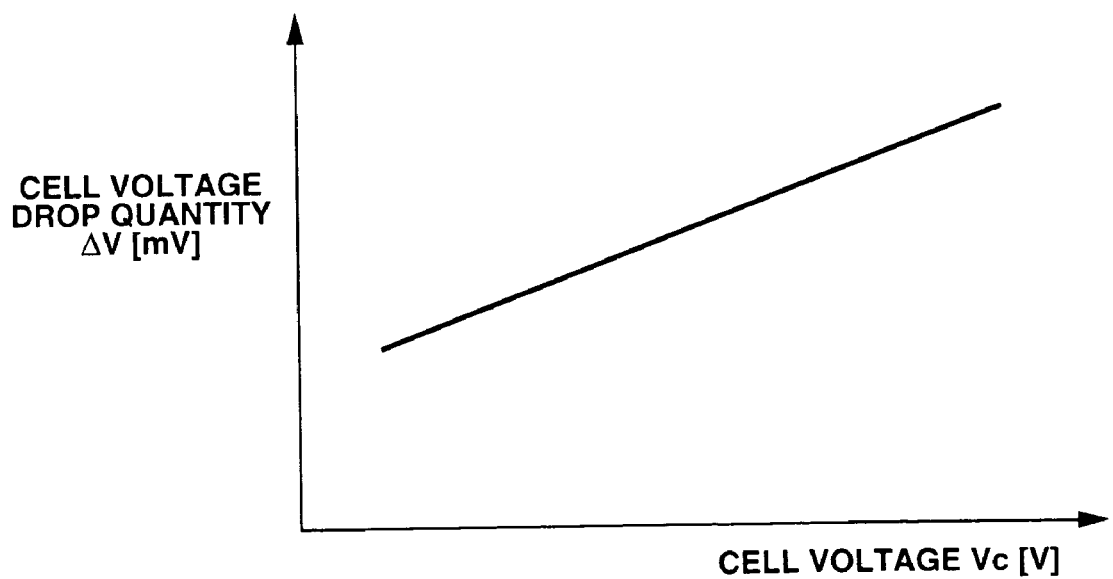
FIG. 3 is a table showing reference values of cell voltage drop quantity used in the battery control system of FIG. 1.
FIG. 4 is a graph showing a characteristic of a cell voltage drop quantity used in the embodiment.

FIG. 3 shows a map stored in memory 3b, of the power consumption expressed by cell voltage drop quantity for each cell. The map data are preliminarily prepared by measurement of the power consumption of each of the cells 1a~1d, by the cell voltage detecting circuit 3d. FIG. 3 shows a reference value of the cell voltage drop quantity $\Delta V$ per predetermined time (100 msec, in this example) in the case of the cell voltage Vc of each of cells 1a~1d being equal to 2V, 3V or 4V. In other words, the reference value of the cell voltage drop quantity $\Delta V$ (or the reference cell drop quantity) is a quantity of cell voltage drop in each cell per predetermined time length when main battery 1 is connected only with cell voltage detecting circuit 3d. In the case of cell 1b, for example, the quantity of charged electricity is consumed by cell voltage detecting circuit 3d, and the cell voltage drop quantity per predetermined time length is equal to $\Delta V = x21$ [mV] when Vc=2V, equal to $\Delta V = x22$ [mV] when Vc=3V, and equal to $\Delta V = x23$ [mV] when Vc=4V.

In this example, the reference cell voltage drop quantity is prepared for each of the cells on the assumption that the power consumptions by cell voltage detecting circuit 3d of the cells 1a~1d are different from one another. However, it is optional to set only one reference cell voltage drop quantity ΔV for use in common for all the cells when the cell voltage drop quantity ΔV is uniform or approximately uniform among cells $1a\sim1d$.

When the sensed value of the per-predetermined-time cell voltage drop quantity ΔV of cell $1b$ is equal to ×22 [mV] in the case of cell voltage Vc being equal to 3V, it is assumed that the power (charged electricity) of cell $1b$ is consumed only by cell voltage detecting circuit $3d$. In this case, no discharge current flows from cell $1b$ to the load other than cell voltage detecting circuit $3d$, that is, to inverter 8 and accessory system 10, and no regenerative charging current flows from inverter 8. That is, neither charge current nor discharge current flows through current sensor 6. This situation includes the case in which a regenerative current from inverter 8 is all supplied to accessory system 10, and none is supplied to main battery 1.

When the sensed value of the cell voltage drop quantity ΔV is higher than the level of ×22 [mV], the power of cell $1b$ is consumed not only by cell voltage detecting circuit $3d$, but by the other load including inverter 8 and accessory system 10 as well. In this case, a discharge current flows from cell $1b$ to cell voltage detecting circuit $3d$, and moreover the discharge current flows from cell $1b$ through current sensor 6 to inverter 8 and accessory system 10.

When the sensed value of the cell voltage drop quantity ΔV is lower than the level of ×22 [mV], that is when the cell voltage is increasing, it is assumed that the power of cell $1b$ is consumed by cell voltage detecting circuit $3d$, and at the same time the cell $1b$ is charged by a regenerated charging current from inverter 8. In this case, a discharge current flows from cell $1b$ to cell voltage detecting circuit $3d$, and at the same time a regenerated charge current flows to cell $1b$ through current sensor 6 from inverter 8.

The cell voltage drop quantity ΔV by power consumption by cell voltage detecting circuit $3d$ has a characteristic expressed by a linear equation as shown in FIG. 4 with respect to the cell voltage Vc. Therefore, when the cell voltage Vc is not equal exactly to one of 2V, 3V and 4V, but the cell voltage Vc is equal to an intermediate value among two, it is possible to determine a cell voltage drop quantity ΔV for the intermediate voltage by interpolation based on the map data shown in FIG. 3.

When the sensed value of the cell voltage drop quantity ΔV during the predetermined time interval, of cell $1b$ is equal to the corresponding reference value shown in FIG. 3, the battery control system judges that no charge/discharge current flows through current sensor 6, and hence the output of current sensor 6 is an offset. In the operation for judging whether the sensed cell voltage drop quantity ΔV is equal to the reference value of FIG. 3 or not, there is provided a width of allowance for the cell voltage drop ΔV in FIG. 3. The explanation is applied to cells $1a$, $1c$ and $1d$ as well, though cell $1b$ is taken as an example.

The above-mentioned judgment is carried out cell by cell for all the cells $1a\sim1d$ as to whether a charge/discharge current is flowing through current sensor 6. In this example, the system checks the number of cells for which a judgment is made that no discharge/charge current is flowing through current sensor 6, and makes a conclusive judgment that no current is flowing through current sensor 6 when the percentage of the number of cells judged to be in a non-current state, in the number of the cells connected in series of main battery 1 is equal to or greater than a predetermined percentage. In this example, this predetermined percentage is 80%.

Each of cells $1a\sim1d$. is connected with a unique one of discharge circuits $25\sim28$ of capacity adjusting circuit $3e$, in addition to cell voltage detecting circuit $3d$. When the capacity adjustment is performed for cells $1a\sim1d$ by turning on transistors Tr1~Tr4 of discharge circuits $25\sim28$, and discharging cells $1a\sim1d$, discharge current flows to discharge circuits $25\sim28$ of capacity adjusting circuit $3e$ in addition to cell voltage detecting circuit $3d$.

Figure 5:
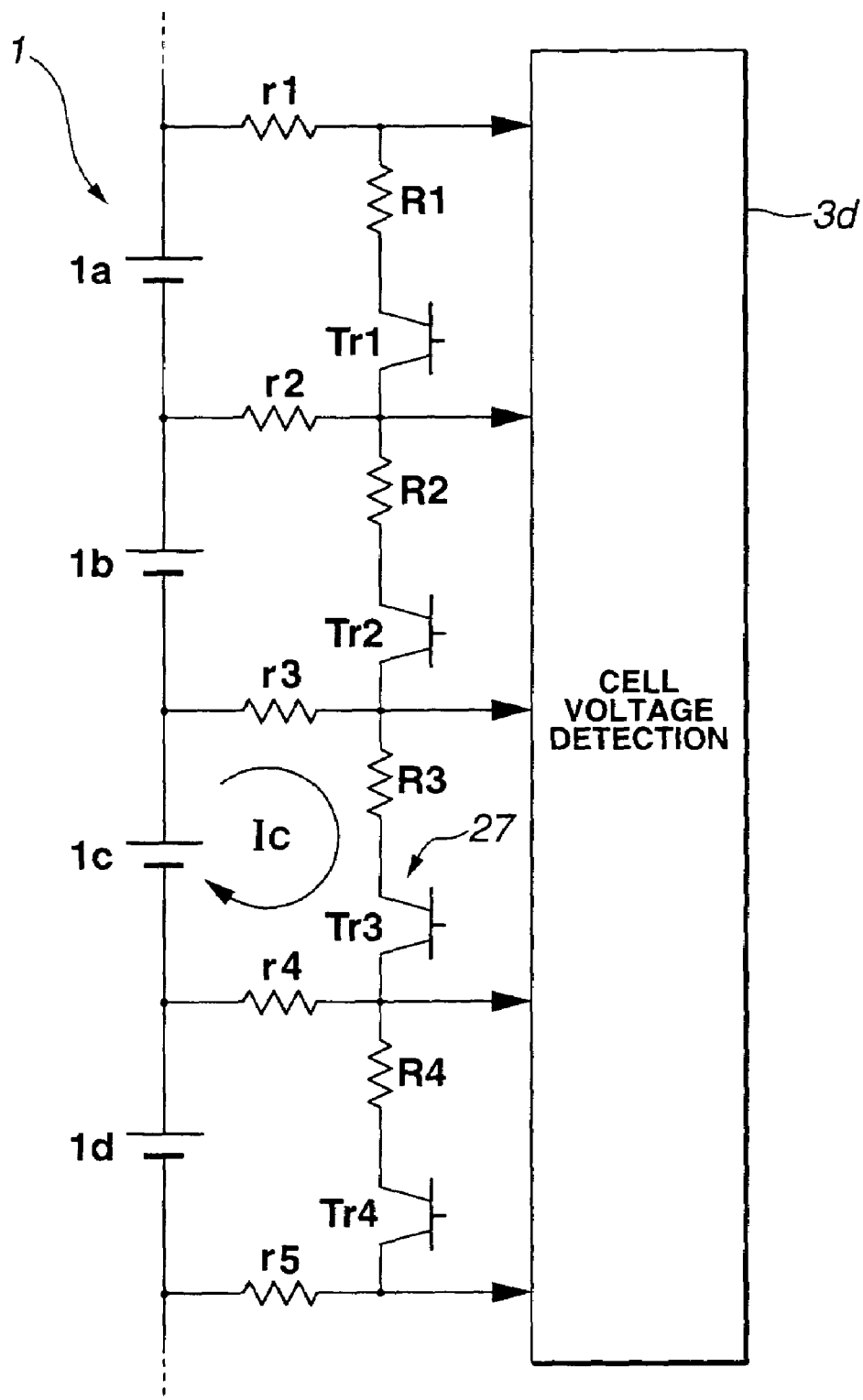
FIG. 5 is a diagram for illustrating the voltage drop quantity in main battery shown in FIG. 1, at the time of capacity adjustment operation.

FIG. 5 illustrates the voltage drop during capacity adjustment in cell voltage detecting circuit $3d$ of main battery 1. In FIG. 5, r1~r5 are resistors representing circuit resistances in voltage sensing measurement lines. When, for example, a discharge current Ic flows in discharge circuit 27 for cell $1c$, for capacity adjustment, the flow of discharge current Ic causes a voltage drop $\{(r3+r4)\cdot Ic\}$, and the sensed voltage Vc of cell $1c$ under capacity adjustment, sensed by cell voltage detecting circuit $3d$ is decreased by the amount equaling the voltage drop $\{(r3+r4)\cdot Ic\}$.

Therefore, measurement of the per-predetermined-time voltage drop quantity ΔV for cell $1c$ under capacity adjustment may incur a considerable error in the result of measurement, and leads to a misjudgment as to the flow of a charge/discharge current through current sensor 6. To avoid such a misjudgment, the system according to this embodiment is configured to exclude cell $1c$ under capacity adjustment from the group of cells for which a judgment is made as to whether a charge/discharge current is flowing through current sensor 6.

In each of the cells $1b$ and $1d$ adjacent to cell $1c$ under capacity adjustment, the cell voltage Vc is decreased by the amount of voltage drop $(r3\cdot Ic)$ or $(r4\cdot Ic)$. However, the measurement error of the cell voltage Vc in each of the cell $1b$ on the upper side of cell $1c$ and the cell $1d$ on the lower side of cell $1c$ is small as compared to the error in cell $1c$ under Capacity adjustment. Therefore, the system according to this embodiment includes cells $1b$ and $1d$ adjacent to the cell under capacity adjustment in the group of cells for which a judgment is made as to whether a charge/discharge current flows through current sensor 6.

Therefore, the system excludes cell $1c$ under capacity adjustment, and checks the remaining cells $1a$, $1b$ and $1d$ as to whether a charge/discharge current flows through current sensor 6. When the percentage of the number of cells judged to be in the non-discharge/charge-current state free of a charge/discharge current flowing through current sensor 6, out of the number of the cells $1a$, $1b$ and $1d$ is equal to or greater than the predetermined percentage or 80% in this example, the system judges that no current is flowing through current sensor 6. In this case, the system senses the output of current sensor 6 as an offset, and stores the output of current sensor 6 as offset quantity in memory $3b$. Thereafter, the system determines a correct value of the sensed charge/discharge current by subtracting the offset value stored in memory $3b$ from the current sensed by current sensor 6.

Each time it is judged that current sensor 6 receives no charge/discharge current of main battery 1, the system determines a new offset value for current sensor 6, and updates the offset quantity stored in memory $3b$ with the new offset value.

Figure 6:
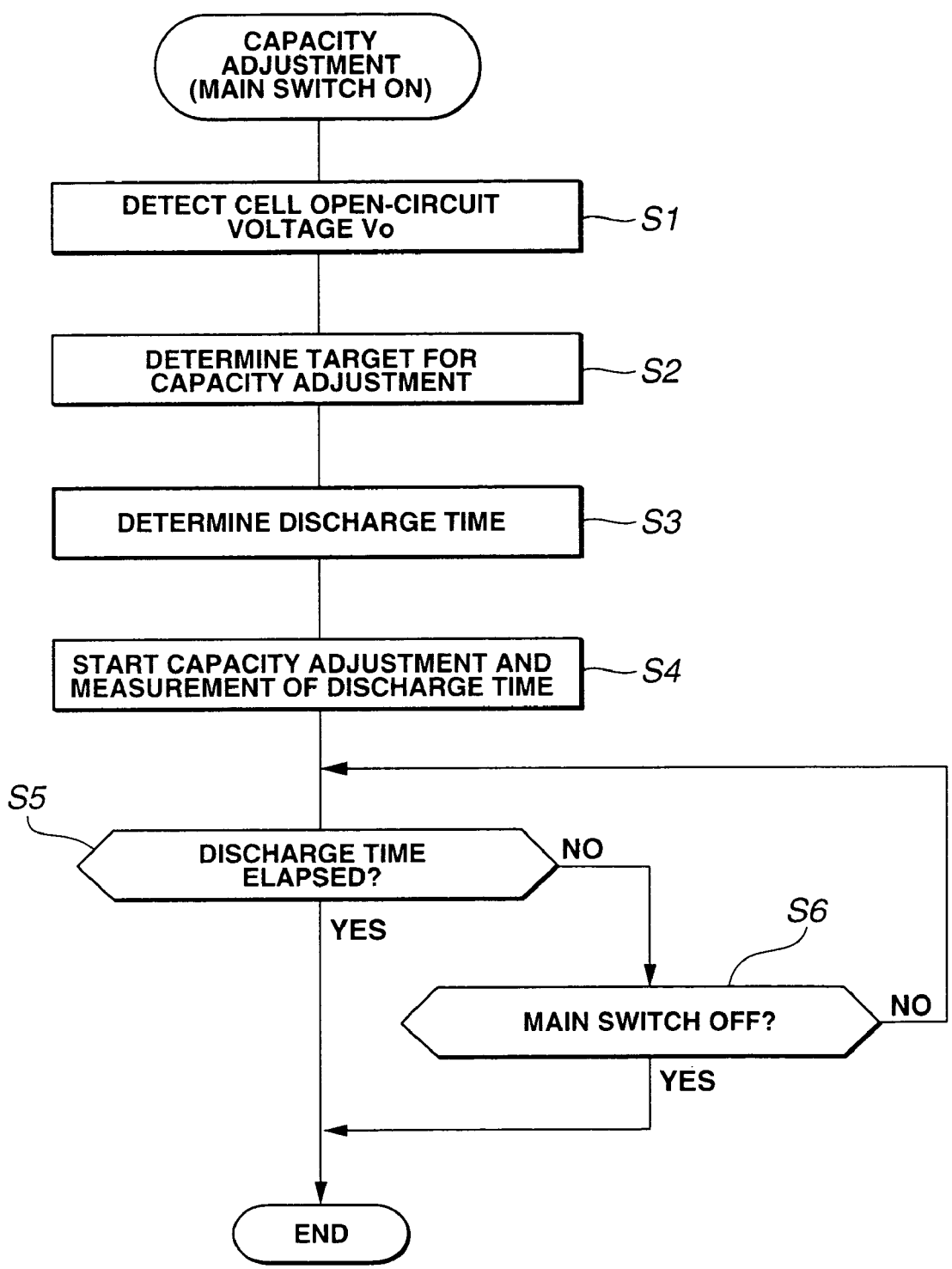
FIG. 6 is a flowchart showing a capacity adjusting process in the embodiment.

FIG. 6 is a flowchart showing the capacity adjustment. CPU $3a$ of battery controller 3 controls cell voltage detecting circuit $3d$ and capacity adjustment circuit $3e$, and starts the capacity adjustment of cells $1a\sim1d$ when main switch 13 is turned on.

At step S1, CPU $3a$ senses the open-circuit cell voltages Vo of cell blocks or cell units $1a\sim1d$ with cell voltage detecting circuit 3*d* during a period from a turn-on of main switch 13, to a turn-on of main relay 7 (to the closed state), that is, while main battery 1 is in a no-load state. At step S2, CPU 3*a* selects a minimum value minVo from the sensed open-circuit cell voltage Vo of cells 1*a*~1*d*, and sets the minimum value minVo as a capacity adjustment target. For each of the cells other than the cell of the minimum value minVo, the charged capacity is discharged by the corresponding one of discharge circuits 25~28 of capacity adjusting circuit 3*e* until the open-circuit cell voltage Vo becomes equal to the minimum value minVo.

At step S3 following step S2, CPU 3*a* determines a discharge time (duration) for each of cells 1*a*~1*d* in accordance with the deviation of the open-circuit cell voltage Vo from the minimum minVo. An optimum value of the discharge time is determined in accordance with the kind of the battery, the total number of cells, the discharge current, etc. At step S4, CPU 3*a* starts a discharge operation for all the cells other than the cell corresponding to the minimum value minVo, with discharge circuits 25~28 of capacity adjustment circuit 3*e*, and at the same time starts measuring the discharge time with timer 3*c* individually for the cells under the capacity adjustment.

At step S5, CPU 3*a* checks whether the discharge time has elapsed for all the cells under capacity adjustment, and terminates the capacity adjustment process if the discharge time has elapsed for all the cells under capacity adjustment. If the discharge time has not yet elapsed for one or more cells under capacity adjustment, CPU 3*a* proceeds from step S5 to step S6, and examines whether main switch 13 is turned off. CPU 3*a* terminates the capacity adjustment process when main switch 13 is off, and returns to step S5 to continue the capacity adjustment when main switch 13 is not turned off.

Figure 7:
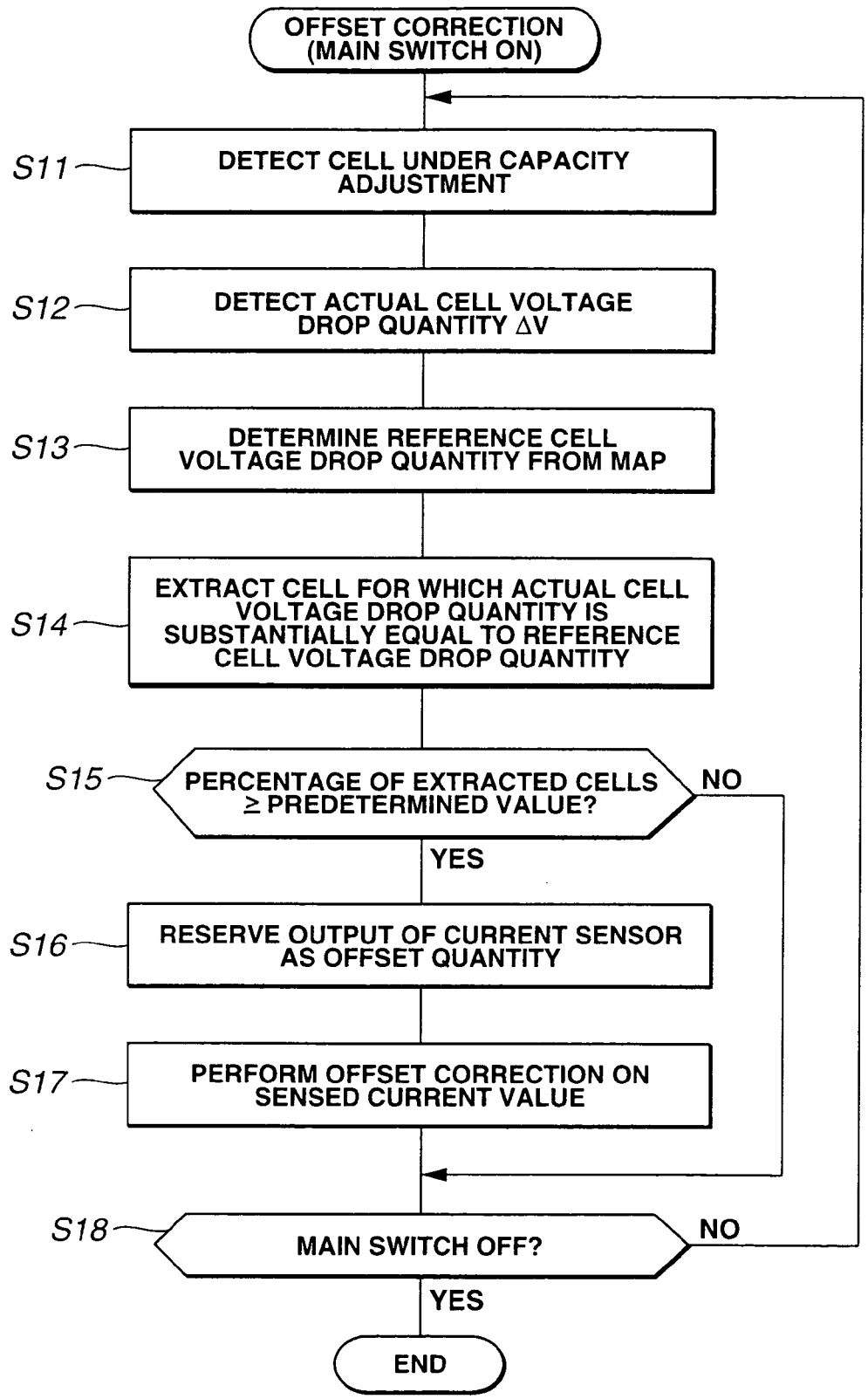
FIG. 7 is a flowchart showing an offset correction process in the embodiment.

FIG. 7 shows an offset correcting process according to this embodiment. CPU 3*a* of battery controller 3 senses the offset value of current sensor 6 and starts an offset correction of the sensed current when main switch 13 is turned on.

At step S11, CPU 3*a* detects a cell or cells currently being under the capacity adjustment by using voltage sensors 21~24. As mentioned before, a cell under capacity adjustment could mislead the judgment as to whether a charge/discharge current is flowing through current sensor 6. Therefore, the cell under capacity adjustment is excluded from the judgment. It is optional to detect a cell under capacity adjustment by monitoring the on/off state of transistor Tr1, Tr2, Tr3 or Tr4 of capacity adjustment circuit 3*e*, or monitoring the discharge times of cells 1*a*~1*d* measured with timer 3*c*.

At step S12, CPU 3*a* determines the cell voltage drop quantity per predetermined time interval (100 msec) for each of the cells 1*a*~1*d* excepting one or more cells under capacity adjustment, if any, with cell voltage detecting circuit 3*d*. In this example, CPU 3*a* checks the cell voltage Vcn (n represents the cell number) for each of the cells under the voltage drop measurement twice at two different time points separated by the predetermined time interval (100 msec, for example), and determines the cell voltage drop quantity $\Delta Vn$ for each cell by subtraction from the cell voltage Vc1n sensed first at the first time point, of the cell voltage Vc2n sensed at the second time point after the predetermined time interval.

At step S13, CPU 3*a* determines a reference value of the cell voltage drop quantity $\Delta V$ corresponding to the cell voltage Vc obtained at step S12, by interpolation from the map data of FIG. 3 stored in memory 3*b*. At next step S14, CPU 3*a* compares the sensed cell voltage drop quantity $\Delta V$ obtained at step S12, with the reference value obtained at step S13 for each of the cells except for one or more cells under capacity adjustment, if any, and extracts one or more cells for which the sensed cell voltage drop quantity $\Delta V$ is approximately equal to the reference value.

At step S15, CPU 3*a* checks the percentage of cells for which the sensed actual cell voltage drop quantity $\Delta V$ is substantially equal to the reference quantity, among all the cells under examination, excluding one or more cells under capacity adjustment. CPU 3*a* compares the percentage with a predetermined value (80% in this example), and proceeds to step S16 when the percentage is equal to or greater than the predetermined value, and to step S18 when the percentage is smaller than the predetermined value.

At step S16, CPU 3*a* judges that current sensor 6 is in a no-current state in which no charge/discharge current flows through current sensor 6, and stores the current output value of current sensor 6 as a most recent value of the offset quantity in memory 3*b*. At step S17, CPU 3*a* corrects the current sensed by current sensor 6 with the most recent value of the offset quantity stored in memory 3*b*. At step S18, CPU 3*a* examines whether main switch 13 is turned off or not. CPU 3*a* terminates the process when main switch 13 is off, and returns to step S11 to repeat the process when main switch 13 is not in the off state.

Thus, the battery control system according to this embodiment stores one or more values of the reference cell voltage drop quantity for each cell during the predetermined time interval (100 msec, for example) in the reference state in which main battery 1 is connected only with cell voltage detecting circuit 3*d*, and extracts any cell for which the actual cell voltage drop quantity $\Delta V$ during the predetermined time interval, sensed by cell voltage detecting circuit 3*d* is within a narrow range around the corresponding value of the reference voltage drop quantity stored in the memory, or substantially equal to the corresponding reference voltage drop quantity. Then, the control system calculates the percentage of the extracted cells in all the cells in main battery 1. When the percentage is higher than or equal to the predetermined percentage value, the control system judges that neither discharge current nor charge current flows through current sensor 6, and reserves the then-existing output value of current sensor 6 as the offset quantity for use to correct the sensed current value of current sensor 6. Therefore, this battery control system can ascertain the offset quantity for current sensor 6, perform the offset correction of the sensed discharge/charge current even during the normal driving operation of the vehicle, and hence improve the accuracy in the current detection.

In this embodiment, a cell is excluded from the cell voltage drop check of comparing the actual voltage drop quantity with the reference if the cell is under the capacity adjustment. Therefore, the control system can determine accurately whether current sensor 6 is in the non-discharge/charge-current state, and determines the offset quantity accurately.

In this embodiment, the range of voltage Vc of each cell is divided into a plurality of divisions, and a value of the reference voltage drop quantity is prepared for each of the divisions, as shown in FIG. 3. Therefore, the control system can detect the non-discharge/charge-current state of current sensor 6 accurately, and determines the offset quantity accurately.

In the illustrated example, inverter 8 serves as a motor drive control circuit; accessory system 10 serves a vehicle accessory; cell voltage detecting circuit 3*d* serves as a voltage detecting circuit; memory 3*b* serves as a reference voltage drop memory section and a memory for storing the offset quantity; and CPU 3*a* serves as a judging circuit or an offset detecting section, a cell extracting circuit, and a correcting section. However, each element is not limited to the above-mentioned construction.

In the illustrated example, main battery 1 is arranged to supply power through current sensor 6 and main relay 7, to inverter 8 and accessory system 10. However, the present invention is applicable, with the same effects, to a vehicle in which main batter 1 is arranged to supply power only to inverter 8, and accessory system 10 is connected with auxiliary battery 5 to receive power therefrom. In this case, current sensor 6 senses a discharge current flowing from main battery 1 to inverter 8, and a charge current flowing from main inverter 8 to main battery 1.

In the illustrated embodiment, main battery 1 is a battery pack composed of a series combination of cell units each of which includes only one cell. However, the present invention is applicable to a battery pack composed of series combination of cell units or cell blocks each of which is a parallel combination of cells. In this case, cell voltage detecting circuit 3*d* senses a voltage of each cell unit, that is an average voltage of cells connected in parallel in the cell unit, and memory 3*b* stores, as a reference, a voltage drop quantity during a predetermined time interval, of each cell unit in the reference state in which the battery pack is connected only to cell voltage detecting circuit 3*d*. Then, controller 3 compares the actual cell unit voltage drop quantity of each cell unit, sensed by cell voltage detecting circuit 3*d*, with the corresponding reference, and thereby extracts any of the cells for which the actual voltage drop quantity is substantially equal to the reference. In this case, any cell unit under the capacity adjustment is excluded form the voltage check. Controller 3 judges that current sensor 6 is in the non-discharge/charge-current state in which no discharge/charge current flows through current sensor 6, when the percentage of extracted cell units is higher than or equal to a predetermined percent among all the cell units of the battery pack.

In this embodiment, the range of voltage Vc of each cell unit is divided into a plurality of divisions, and a value of the reference voltage drop quantity is prepared for each of the divisions. Controller 3 compares the actual cell unit voltage quantity of each cell unit, sensed by cell voltage detecting circuit 3*d*, with the reference of the corresponding division of the voltage range of the cell unit, and thereby extracts any of the cell units for which the actual voltage drop quantity is substantially equal to the reference.

In the preceding embodiments, the cell unit voltage Vc and the cell unit voltage drop quantity ΔV are sensed by cell voltage detecting circuit 3*d* for each of the cell units 1*a*~1*d*, and the no-discharge/charge current state of current sensor 6 is detected from the voltage and voltage drop quantity. However, it is possible to use a total voltage of a battery pack. In this embodiment, voltage sensor 11 is employed to sense the total voltage of the battery pack and its voltage drop quantity during a predetermined time interval, and the controller 3 uses the sensed total voltage and the total voltage drop quantity to determine whether current sensor 6 is in the non-discharge/charge current state or not. In this case, memory 3*b* stores values of the reference total voltage drop quantity during the predetermined time interval in the reference state in which the battery pack is connected only with the total voltage sensor 11. Controller 3 compares the actual total voltage drop quantity during the predetermined time interval sensed by voltage sensor 11, with the reference total voltage drop quantity, and judges that current sensor 6 is in the non-discharge/charge-current state, when the actual total voltage drop quantity is substantially equal to the reference total voltage drop quantity.

This application is based on a prior Japanese Patent Application No. 2002-214934 filed on Jul. 24, 2002. The entire contents of this Japanese Patent Applications No. 2002-214934 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A battery control apparatus comprising:
   a battery pack including a series combination of cell units;
   a motor drive control circuit to receive a discharge current from the battery pack to drive a traction motor of a vehicle, and to supply a charge current to the battery pack;
   a current sensor to sense a discharge/charge current flowing from the battery pack as the discharge current and flowing to the battery pack as the charge current;
   a voltage detecting circuit to sense a voltage between two separate points in the series combination of the cell unit of the battery pack;
   a reference voltage drop memory section to store a reference voltage drop quantity representing a decrease in voltage during a predetermined time interval between the two separate points in a reference state;
   an offset detecting section to compare an actual voltage drop quantity which is a decrease in voltage during the predetermined time interval between the two separate points, sensed by the voltage detecting circuit, with the reference voltage drop quantity stored in the reference voltage drop memory section, to detect a non-discharge/charge-current state of the current sensor in accordance with a result of comparison between the actual voltage drop quantity and the reference voltage drop quantity, and to reserve an output of the current sensor, as an offset quantity when the non-discharge/charge current state is detected; and
   a correcting section to correct a sensed value of the discharge/charge current sensed by the current sensor, in accordance with the offset quantity reserved by the offset detecting section.

2. The battery control apparatus as claimed in claim 1, wherein the battery pack includes a plurality of cells, and each of the cell units includes at least one of the cells, wherein the reference voltage drop quantity is a preliminarily determined voltage drop quantity representing a voltage decrease during the predetermined time interval between the two separate points in the reference state in which the battery pack is connected only with the voltage detecting circuit; and the offset detecting section is configured to determine whether the actual voltage drop quantity is substantially equal to the reference voltage drop quantity, and to determine the existence or nonexistence of the non-discharge/charge current state of the current sensor in accordance with the result of examination as to whether the actual voltage drop quantity is substantially equal to the reference voltage drop quantity.

3. The battery control apparatus as claimed in claim 2, wherein the voltage detecting circuit includes a total voltage sensor to sense a total voltage of the battery pack connected between the two separate points; the offset detecting section is configured to compare the actual voltage drop quantity which is an actual total voltage drop quantity sensed by the total voltage sensor, with the reference voltage drop quantity, and to judge that the current sensor is in the non-discharge/charge current state when the actual total voltage drop quantity is substantially equal to the reference voltage drop quantity.

4. The battery control apparatus as claimed in claim 2, wherein the voltage detecting circuit is configured to sense a cell unit voltage across each of the cell units of the battery pack; the reference voltage drop memory section is configured to store the reference voltage drop quantity across each of the cell units; and the offset detecting section is configured to compare the actual voltage drop quantity with the reference voltage drop quantity for each of the cell units, to extract any cell unit for which the actual voltage drop quantity is substantially equal to the reference voltage drop quantity, and to detect the non-discharge/charge-current state of the current sensor in accordance with a proportion of extracted cell unit or cell units in relation to the battery pack.

5. The battery control apparatus as claimed in claim 4, wherein the offset detecting section extracts any of the cell units as an off unit if the actual voltage drop quantity for the cell unit is substantially equal to the reference voltage drop quantity of the cell unit, and judges the non-discharge/charge-current state to be present when a percentage of the number of the unit cells extracted as the off unit, to the number of the unit cells is equal to or greater than a predetermined value.

6. The battery control apparatus as claimed in claim 5, wherein the battery control apparatus further comprises a capacity adjusting circuit to adjust a capacity of each cell unit by performing a capacity adjustment operation on each cell; and the offset detecting section is configured not to extract any of the cell units as the off unit if the cell unit is under the capacity adjustment operation.

7. The battery control apparatus as claimed in claim 4, wherein the reference voltage drop memory section stores the reference voltage drop quantity for each of divisions into which a voltage range of the voltage of each cell unit is divided; and the offset detecting section selects the reference voltage drop quantity for each cell unit in accordance with the voltage across the cell unit, and compare the actual voltage drop quantity with a selected one of the reference voltage drop quantity.

8. The battery control apparatus as claimed in claim 1, wherein the current sensor is connected in a circuit section to sense a discharge current supplied from the battery pack to the motor drive control circuit and a vehicle accessory system, and the charge current supplied from the motor drive control circuit to the battery pack.

9. The battery control apparatus as claimed in claim 1, wherein each cell unit is one of a single cell unit including only one cell and a multiple cell unit including a parallel combination of cells, and the offset detecting section is configured to detect the non-discharge/charge-current state even while a main switch of the vehicle is in an on state to put the vehicle in a normal running operation.

10. A battery control apparatus comprising:
a battery pack including a series combination of cell units;
a motor drive control circuit to receive a discharge current from the battery pack to drive a traction motor of a vehicle, and supply a charge current to the battery pack;
a current sensor to sense a discharge/charge current of the battery pack which is one of the discharge current and the charge current;
a voltage detecting circuit to sense a voltage between two separate points in the series combination of the cell units of the battery pack;
means for storing a reference voltage drop quantity representing a decrease in voltage during a predetermined time interval between the two separate points;
means for comparing an actual voltage drop quantity which is a decrease in voltage during the predetermined time interval between the two separate points, sensed by the voltage detecting circuit, with the reference voltage drop quantity, and for detecting a non-discharge/charge current state in accordance with a result of comparison between the actual voltage drop quantity and the reference voltage drop quantity;
means for storing, as an offset quantity, an output of the current sensor obtained when the non-discharge/charge-current state is detected; and
means for correcting a sensed value of the discharge/charge current sensed by the current sensor, in accordance with the offset quantity.

11. A battery control process for a battery system of a battery pack including a series combination of cell units, and a motor drive control circuit to receive a discharge current from the battery pack to drive a traction motor of a vehicle, and supply a charge current to the battery pack, the battery control process comprising:
sensing a voltage between two separate points in the series combination of the cell units of the battery pack to determine an actual voltage drop quantity during a predetermined time interval;
comparing the actual voltage drop quantity with a preliminarily stored reference voltage drop quantity, to judge a non-discharge/charge-current state to be present in accordance with a result of comparison between the actual voltage drop quantity and the reference voltage drop quantity;
reserving, as an offset quantity, a sensed value of a discharge/charge current when the non-discharge/charge-current state is present; and
determining a corrected current value by subtracting the offset quantity from the sensed value of the discharge/charge current.

* * * * *